(12) United States Patent
Motomura

(10) Patent No.: US 6,654,560 B2
(45) Date of Patent: Nov. 25, 2003

(54) PHOTOGRAPHING SYSTEM AND PHOTOGRAPHING METHOD

(75) Inventor: Masatugu Motomura, Suita (JP)

(73) Assignee: Studio Alice Co., Ltd., Osaka (JP)

( * ) Notice: Subject to any disclaimer, the term of this patent is extended or adjusted under 35 U.S.C. 154(b) by 145 days.

(21) Appl. No.: 09/748,173

(22) Filed: Dec. 27, 2000

(65) Prior Publication Data
US 2001/0001271 A1 May 17, 2001

(51) Int. Cl.⁷ .......................... G03B 17/24; G03B 17/48
(52) U.S. Cl. .................. 396/310; 396/429; 348/64; 348/222.1; 348/333.05; 355/40; 355/41
(58) Field of Search ................... 396/310, 429; 348/64, 229.1, 344, 333.05, 222, 232, 233; 358/906, 909.1

(56) References Cited

U.S. PATENT DOCUMENTS

| | | | | |
|---|---|---|---|---|
| 4,782,390 A | * | 11/1988 | Hayashi et al. | 355/38 |
| 4,827,347 A | * | 5/1989 | Bell | 348/231.7 |
| 4,841,359 A | | 6/1989 | Hawkins et al. | 358/76 |
| 5,517,271 A | * | 5/1996 | Yamaguchi et al. | 396/612 |
| 5,576,836 A | * | 11/1996 | Sano et al. | 355/40 |
| 5,619,257 A | * | 4/1997 | Reele et al. | 396/429 |
| 5,666,215 A | | 9/1997 | Fredlund et al. | 358/487 |
| 5,777,667 A | * | 7/1998 | Miyake et al. | 348/224.1 |
| 5,845,166 A | * | 12/1998 | Fellegara et al. | 396/429 |
| 5,910,835 A | * | 6/1999 | Masutani | 355/27 |
| 5,963,204 A | * | 10/1999 | Ikeda et al. | 348/335 |
| 6,047,130 A | | 4/2000 | Oles | 396/1 |
| 6,049,392 A | * | 4/2000 | Kida | 355/40 |
| 6,104,885 A | * | 8/2000 | McIntyre et al. | 348/64 |
| 6,233,015 B1 | * | 5/2001 | Miller et al. | 348/222.1 |
| 6,259,863 B1 | * | 7/2001 | Marauyama | 396/429 |
| 6,262,790 B1 | * | 7/2001 | Kinjo | 355/40 |
| 6,313,877 B1 | * | 11/2001 | Anderson | 348/333.05 |

FOREIGN PATENT DOCUMENTS

| | | | |
|---|---|---|---|
| JP | 6273847 | | 9/1994 |
| JP | 10-126725 | * | 5/1998 |
| JP | 2000-209494 | * | 7/2000 |
| WO | 98/15116 | * | 4/1998 |

* cited by examiner

Primary Examiner—D Rutledge
(74) Attorney, Agent, or Firm—Rader Fishman & Grauer

(57) ABSTRACT

A photographing system for speedily providing photographs meeting a customer's request at relatively low prices is provided. An image of a subject is recorded on a film by a film camera. A still image of the subject is take by an electronic camera in synchronization with the film camera. An identification code generated every photographing is written at a position other than the image on the film to make a one-to-one correspondence between the image and the identification code. The still image is recorded in a recorder with the identification code. The still images retrieved from the recorder are simultaneously displayed with the identification codes on a first monitor. A desired still image is selected, and displayed on a second monitor with the corresponding identification code. Then, the image on the film having the same identification code of the desired still image is printed.

15 Claims, 5 Drawing Sheets

PHOTOGRAPHING SYSTEM AND PHOTOGRAPHING METHOD

BACKGROUND OF THE INVENTION

1. Field of the Invention

The present invention relates to a photographing system, which is preferably used in a photo studio to speedily provide photographs meeting a customer's request at relatively low prices, and a photographing method.

2. Disclosure of the Prior Art

In the past, the photographic technology for recording an image of a subject on a photosensitive material is well known. As compared with image recording technologies using electric signals, photographs are excellent in resolution and granularity. In addition, after developing and printing treatments, it is possible to see the photographs at any time without using displaying devices such as monitors. Therefore, the photographs are widely used in a photo studio.

On the other hand, when the photographs of the subject are taken in the photo studio, whether the photographs have been taken well or not can not be checked until the developing and printing treatments are finished. In addition, if no photograph meeting a customer's request is obtained, the photographing operation has to be tried again in the photo studio. These cause considerable wastes of time and money. In recent years, though time required finishing the developing and printing treatments has been shortened, it takes at least 30 minutes under the present circumstances.

To avoid the waste of time, a service of successively taking a large number of photographs and selecting good photographs meeting the customer's request from the photographs is proposed. However, there is another problem of causing wastes of a developer used in the developing treatment and printing papers used in the printing treatment To solve this kind of problem, Japanese Patent Publication [kokoku] No. 7-113733 discloses a photographing method comprising the steps of recording images of a subject on a photosensitive material, taking still images of the subject with a TV camera or a digital camera, checking the quality of each of the still images on a display unit, and performing the developing and printing treatments with respect to the images on the photosensitive material corresponding to desired still images.

In general, the photosensitive material is of a roll-type or sheet-type, which is numbered in consecutive order. Therefore, when a proper identification code is given to each of the still images, it is possible to readily obtain a one-to-one correspondence between the consecutive number of the photosensitive material and the identification code. That is, a desired image on the photosensitive material can be selected according to the identification code of the corresponding still image.

However, in point of fact, since the consecutive number of the photosensitive material is not in agreement with the identification code of the still image, it is required to separately perform an operation of checking the one-to-one correspondence therebetween. As the number of the photographs increases, it becomes a burdensome operation.

SUMMARY OF THE INVENTION

Therefore, a primary object of the present invention is to provide an improved photographing system for speedily providing photographs meeting a customer's request at relatively low prices. That is, the photographing system comprises: a film camera for recording an image of a subject on a photosensitive material; an electronic camera for taking a still image of the subject in synchronization with a release of a shutter of the film camera, which is disposed such that a visual field of the electronic camera has a part of the visual field of the film camera; an identification-code generator for generating an identification code every photographing operation with use of the film camera and the electronic camera; an identification-code writing unit for writing the identification code at a position other than the image on the photosensitive material to make a one-to-one correspondence between the image on the photosensitive material and the identification code; a still-image recorder for recording the still image taken by the electronic camera together with the identification code; a playback unit for retrieving the still image from the still-image recorder; a first monitor having a plural-part split screen, on which a plurality of still images obtained by repeating the photographing operation can be simultaneously displayed with corresponding identification codes; a still-image selector for selecting a desired still image from the still images displayed on the first monitor; and a second monitor having a plural-part split screen, on which the desired still image selected by the still-image selector can be displayed with the corresponding identification code.

In the above photographing system of the present invention, a desired still image meeting the customer's request can be selected from the still images recorded in the still-image recorder prior to the developing and printing treatments of the photosensitive material. In addition, since the identification code of the desired still image is equal to the identification code of the corresponding image on the photosensitive material, the image on the photosensitive material corresponding to the desired still image can be readily identified by the identification code. Thus, by reducing efforts to check the correspondence between the still image on the monitor and the image on the photosensitive material and saving the amounts used of a developer and printing papers, it is possible to speedily provide the photographs of the desired images at relatively low prices.

It is preferred that the photographing system farther comprises an input unit for inputting an additional code for making a classification of the still images to the identification code. In this case, since the additional code can be input to the identification code by the input unit, it is possible to retrieve still images satisfying required conditions from a large number of still images taken in the photo studio according to the additional code. Therefore, the operation of selecting the desired image meeting the customer's request can be further enhanced.

It is also preferred that the photographing system further comprises a third monitor having an unsplit screen, on which the desired still image selected by the still-image selector can be enlarged and displayed. In this case, it is possible to more carefully check the details of the selected still image on the third monitor.

It is further preferred that the photographing system comprises an additional recorder for recording the identification code of the desired still image selected by the still-image selector. In this case, it is possible to readily grasp the still images to be developed and printed.

Moreover, it is preferred that the photographing system further comprises a zoom unit for selectively providing a first mode for displaying the desired still image selected by the still-image selector on the third monitor, and a second mode for designating a region of the desired still image and displaying an enlarged view of the designated region on the third monitor. In this case, a further improvement in the checking operation of the details of the selected still image is obtained.

In addition, it is preferred that a visual field of the film camera is in agreement with the visual field of the electronic camera, and the photographing system comprises a trimming unit having the capability of automatically determining a printing range of the image on the photosensitive material according to a region of the desired still image designated by the zoom unit. In this case, when it is required removing undesired portions from the image on the photosensitive material by the trimming unit to obtain a desired photograph, the customer can readily designate the undesired portions of the corresponding still image on the third monitor by use of the zoom unit. In addition, since the printing range is automatically determined according to the designated undesired portions of the still image by the trending unit, it is possible to reduce the cost for the trimming operation.

In addition, it is preferred that the additional code is a group code for classifying the still images according to photographing contents, and the playback unit retrieves the still images having the same group code from the still-image recorder to simultaneously display the still images on the first monitor. In this case, since the still images can be classified to plural groups according to the photographing contents such as customer name or photographing conditions, it is possible to efficiently retrieve a required group of the still images from the still-image recorder.

It is also preferred that the playback unit has the capability of retrieving yet-to-be displayed still images having a same group code from the still-image recorder to simultaneously display the still images on the first monitor.

Another object of the present invention is to provide a photographing method comprising the following steps. That is, an image of a subject is recorded on a photosensitive material by a film camera. A still image of the subject is taken by an electronic camera in synchronization with a release of a shutter of the film camera. An identification code generated every photographing operation with use of the film camera and the electronic camera is written at a position other than the image on the photosensitive material to make a one-to-one correspondence between the image on the photosensitive material and the identification code. The still image taken by the electronic camera is recorded together with the identification code in a still-image recorder. A plurality of still images obtained by repeating the photographing operation are retrieved from the still-image recorder. The retrieved still images are simultaneously displayed together with corresponding identification codes on a first monitor having a plural-part split screen. Next, a desired still image is selected from the still images displayed on the first monitor. The desired still image is displayed together with the corresponding identification code on a second monitor having a plural-part split screen. The image on the photosensitive material having the identification code that is the same as the identification code displayed on the second monitor is printed.

These and still other objects and advantages will become more apparent from the following embodiments of the invention.

DETAILED DESCRIPTION OF THE PREFERRED EMBODIMENTS

First Embodiment

Referring to the attached drawings, a photographing system according to a first embodiment of the present invention is explained below in detail.

Figure 1:
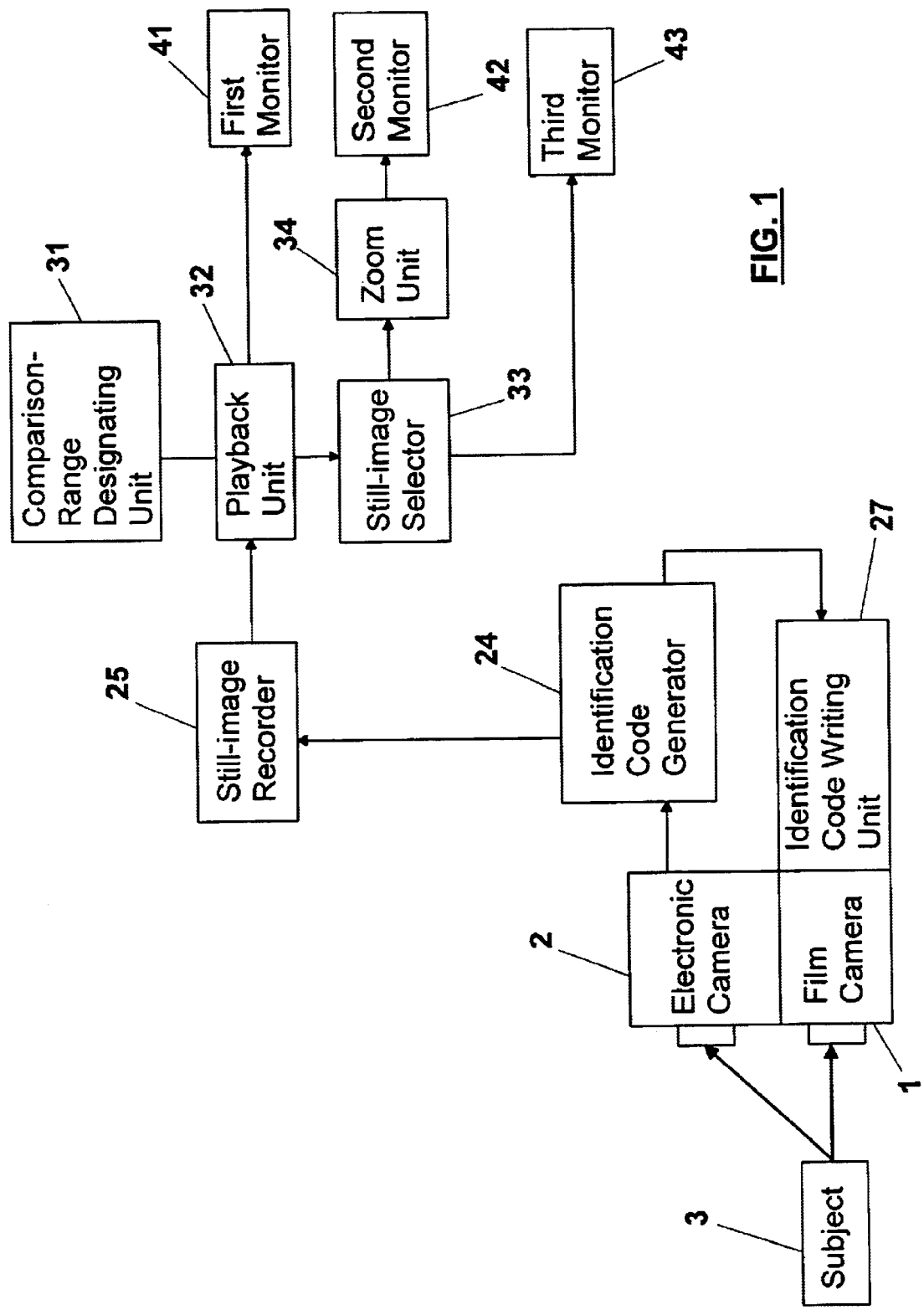
FIG. 1 is a block diagram of a photographing system according to a first embodiment of the present invention.

As shown in FIG. 1, the photographing system comprises a film camera 1 for recording an image of a subject 3 on a photosensitive material such as a roll of film or photographic plates, and an electronic camera 2 for taking a still image of the same subject in synchronization with a release of a shutter of the film camera. The electronic camera 2 is mechanically connected to the film camera 1, and disposed in a positional relation with the film camera such that a visual field of the electronic camera has a part of the visual field of the film camera. In other words, this positional relation can be determined to obtain low parallax between the film camera 1 and the electronic camera 2 with respect to the subject 3.

In this embodiment, the visual field of the electronic camera 2 is adjustable with respect to the visual field of the film camera 1. For example, when the subject is a person, and an image of the whole body or the upper body of the person is recorded by the film camera 1, the visual field of the electronic camera 2 may be determined to obtain a still image of the whole body, upper body or the face of the person. In case of taking the still image of the person's face, it is possible to readily check an important region, i.e., face expression, of the image recorded by the film camera 1. In addition, the visual field of the electronic camera 2 may be determined to be in agreement with the visual field of the film camera 1.

Figure 2:
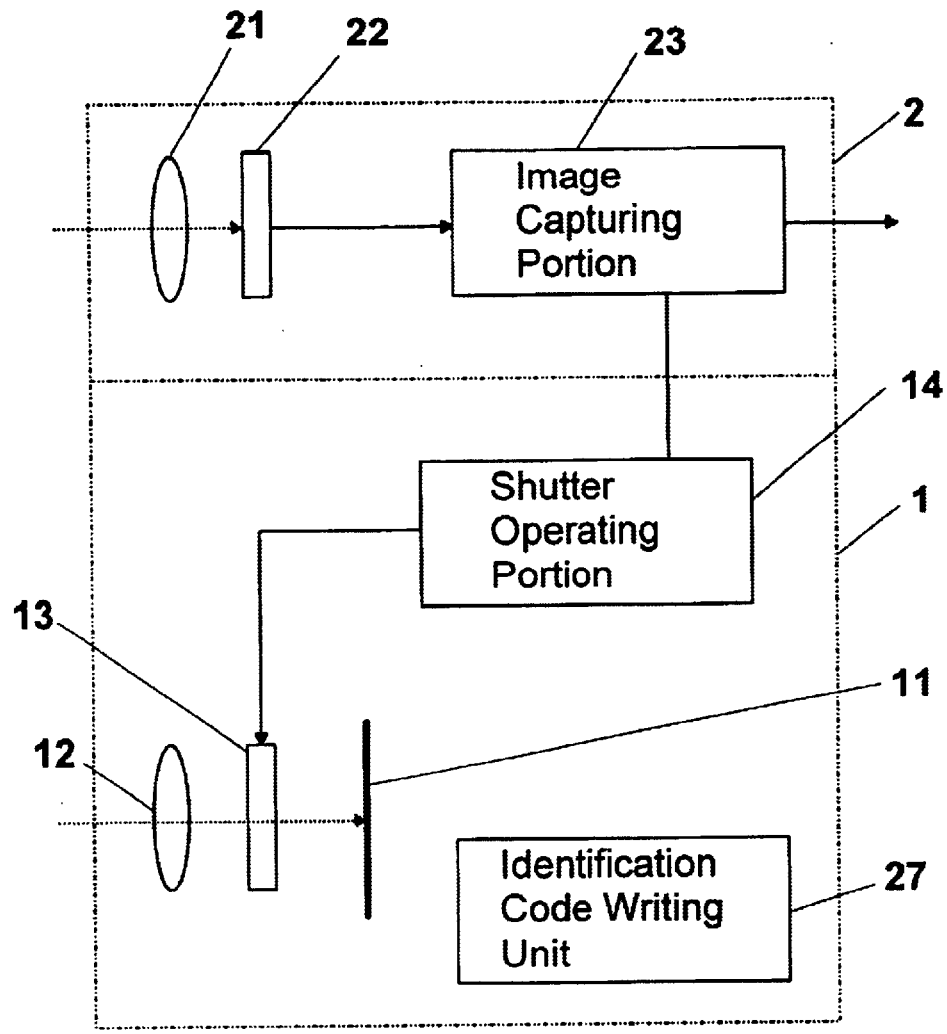
FIG. 2 is a schematic diagram of film camera and electronic camera of the photographing system.

As the film camera 1, as shown in FIG. 2, it is possible to use a conventional film camera using a silver-salt type film of the photosensitive material. The film camera 1 comprises an optical lens system 12 with a filter and a complex lens, which is a lens made up of a number of lens elements arranged into two or more groups, and the shutter 13 disposed in front of the film 11. The release of the shutter 13 can be controlled by a shutter operating portion 14. In addition, the film camera 1 also has a flash sync contact (not shown) or a motor-drive sync contact (not shown), which can be electrically opened or closed in synchronization with the release of the shutter 13.

On the other hand, the electronic camera 2 has an image sensor 22 such as CCD in place of the film, which is disposed behind an optical system 21 with a complex lens. The electronic camera 2 has the capability of converting an image of the subject formed on a light-receiving surface of the image sensor 22 into an electric signal. This electric signal is sent to an image-capturing portion 23 and provided as a digital signal in synchronization with the release of the shutter 13 of the film camera 1. That is, the electronic camera 2 provides the electric signal corresponding to the still image the instant when the shutter 13 of the film camera 1 is released by operating the shutter operating portion 14. Thus, the image of the subject 3 is recorded on the film 11 by the film camera 1, and the still image of the same subject is output from the image-capturing portion 23. The synchronization between the release of the shutter 13 and the capture of the still image can be achieved by inputting a signal provided from the flash sync contact or the motor-drive sync contact of the film camera 1 to a terminal for release of the electronic camera 2.

After a one-to-one correspondence between the still image provided from the electronic camera 2 and an identification code generated by an identification-code generator 24 is made, the still image is recorded with the corresponding identification code in a still-image recorder 25. As the still-image recorder 25, for example, it is possible to use a flexible disc, hard disk, magneto-optical disc, nonvolatile memory and so on. In case of using the flexible disc, magneto-optical disc, or the nonvolatile memory (memory card), which is easily portable, there is an advantage that the photographing operation of the still images and the checking operation of the still images can be performed at different locations.

Figure 3:
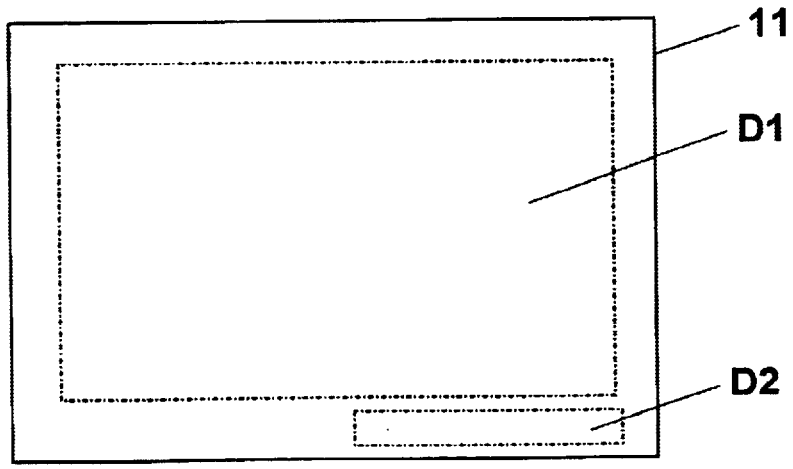
FIG. 3 is a schematic diagram showing the position of an identification code on a film.

In this embodiment, the identification code generated by the identification-code generator 24 is an order code generated every photographing operation by use of the film camera 1 and the electronic camera 2. For example, the order code "01", "02" . . . is automatically given to the still image every photographing operation. The identification code is also sent to an identification-code writing unit 27, which is connected to the film camera 1 to write letters on the film 11 by use of a light-emitting diode indicator. As this device, for example, it is possible to use a conventional technique of writing the date and time of photographing on the film. As shown in FIG. 3, the identification code is written in a margin region D2 other than the image D1 on the film 11. That is, the identification-code writing unit 27 writes the identification code at a region on the film 11, which wields no influence over the image.

A playback unit 32 retrieves still images of a range designated by a comparison-range designating unit 31 with a keyboard or a key pad from the still-image recorder 25. The comparison-range designating unit 31 is usually operated by an operator of the photo studio to retrieve the still images of a desired customer from the still-image recorder 25.

The still images retrieved by playback unit 32 are displayed on a first monitor 41 to compare the still images with each other. The first monitor 41 has a plural-part split screen, on which the retrieved still images can be simultaneously displayed together with corresponding identification codes. For example, the first monitor 41 may have a four-part, nine-part, or sixteen-part split screen. When a plurality of still images of the subject with different clothes, poses or members are taken by the photographing system of the present invention, the still images of the subject with the same cloth, or the still images of the subject with the same pose can be simultaneously displayed on the first monitor 41. Thus, by comparing the still images on the first monitor 41 with each other, it is possible to select a desired image meeting the customer's request from the still images on the first monitor 41.

The identification code is superimposed on a corresponding still image displayed on the first monitor 41. In addition, it is possible to selectively provide display and delete modes of the identification code. Therefore, when the identification code is not needed on the first monitor 41, the delete mode can be selected to display only the still images on the first monitor. This selecting operation can be achieved by operating the keyboard or key pad used for the comparison-range designating unit 31.

To select a desired still image(s) from the still images displayed on the first monitor 41, a still-image selector 33 with a keyboard or key pad is used. That is, the desired still image(s) can be selected by designating the identification code, i.e., the order code in this embodiment, displayed on the first monitor 41 by the still-image selector 33. When each of the split screens of the first monitor 41 has a code, it is also possible to select the desired still image(s) by designating the code. The selected still image(s) is enlarged and displayed on a second monitor 42. The second monitor 42 is a monitor having an unsplit screen for displaying one still image on one screen. Therefore, the customer can readily check the details of the selected still image on the second monitor 42.

The photographing system of this embodiment comprises a zoom unit 34 with a pointing device such as a mouse. When a region of the still image on the second monitor 42 is designated by operating the mouse of the zoom unit 34, the designated region of the still image is further enlarged and displayed again on the second monitor 42. Therefore, by use of this zoom unit, it is possible to more carefully check a specific part of the selected still image on the second monitor 42. The zoom unit 34 selectively provides a normal mode for displaying the selected still image on the second monitor 42 and an enlargement mode for displaying an enlarged view of the specific part of the selected still image on the second monitor 42. As a scaling factor of the still image displayed on the second monitor 42 increases, the granularity becomes poor. Therefore, it is preferred to limit the scaling factor within an inconspicuous range of granularity. Of course, in case of using the electronic camera with higher resolution, it is possible to further increase the scaling factor without fear of granularity.

Next, whether the still image displayed on the second monitor 42 is adopted or rejected is determined by operating the still-image selector 33. When the still image is adopted, it is displayed on a third monitor 43 for determination. Since the third monitor 43 has a plural-part split screen, a plurality of adopted still images can be simultaneously displayed with corresponding identification codes on the third monitor. The third monitor 43 may have a four-part, nine-part, or sixteen-part split screen. The third monitor 43 is useful to finally confirm the contents of the adopted still images.

As described above, when the still images designated by the comparison-range designating unit 31 are retrieved from the still-image recorder 25, a group of the still images are displayed on the first monitor 41. After a desired still image is checked by use of the second monitor, whether the still image displayed on the second monitor 42 is adopted or rejected is determined. The adopted still image is displayed on the third monitor 43. By repeating the above procedure with respect to another groups of the still images recorded in the still-image recorder 25, the customer can select desired still images from all of the still images of the customer in the still-image recorder 25, and the selected still images are simultaneously displayed on the third monitor 43.

Figure 4A:
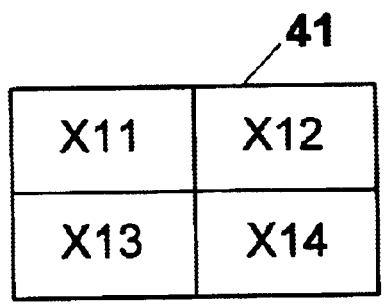
FIGS. 4A to 4G are explanatory diagrams of a photographing method of the present invention.
Figure 4B:
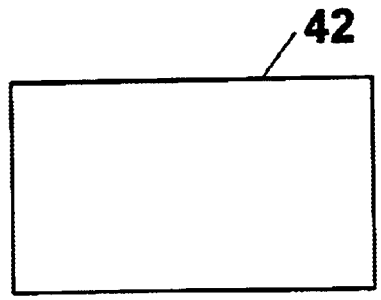
Figure 4D:
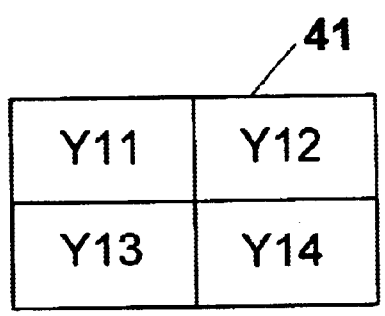
Figure 4C:
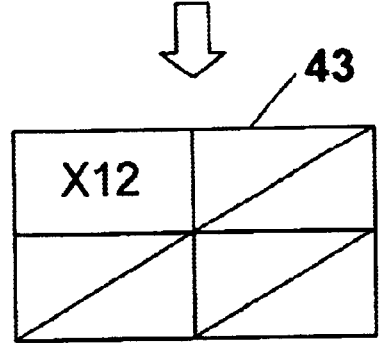
Figure 4E:
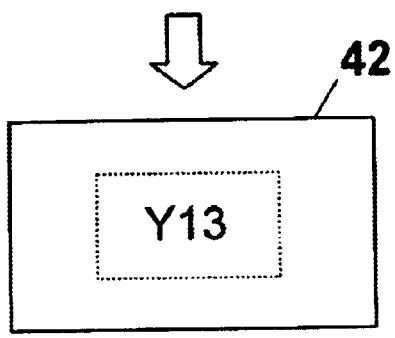
Figure 4F:
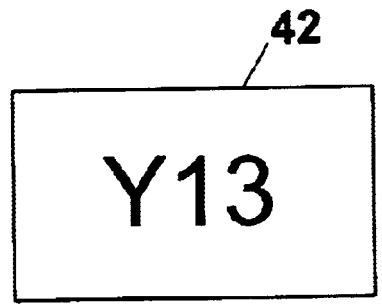
Figure 4G:
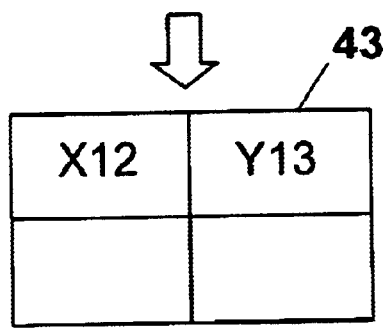

For example, as shown in FIG. 4A, after a group of still images X11, X12, X13, X14 are displayed on the first monitor 41, each of the still images can be checked by use of the second monitor 42, as shown in FIG. 4B. In this case, the still image X12 is selected as a desired still image and displayed on the third monitor 43, as shown in FIG. 4C. Next, another group of the still images Y11, Y12, Y13, Y14 are displayed on the first monitor 41, as shown in FIG. 4D. Similarly, each of the still images can be checked by use of the second monitor 42, as shown in FIG. 4E. For example, when it is needed to more carefully check the details of the still image Y13 on the second monitor 42, a desired region (the region shown by the dotted line in FIG. 4E) of the still image Y13 can be further enlarged and displayed on the second monitor 42 by use of the zoom unit 34, as shown in FIG. 4F. As a result, the still image Y13 is added as the desired still image and displayed on the third monitor 43, as shown in FIG. 4G.

In the system described above, the comparison-range designating unit 31, playback unit 32, selector 33, and the zoom unit 34 can be achieved by installing an application software into a personal computer. Therefore, when using a portable record medium and the personal computer with the application software as the still-image recorder 25, it is possible to realize the above photographing system at relatively low prices. In addition, even when a person other than the operator of the photo studio operates the still-image selector 33, it is possible to readily select the desired still image.

In the above system, the first, second and third monitors 41, 42 and 43 are used. When displaying different still images on these three monitors can not be controlled by use of one personal computer, the functions of these monitors can be obtained by switching the display contents on a single monitor. As the monitors 41, 42, 43, it is preferred to use a color monitor, and more preferably a color CRT to obtain good repeatability of color of the still image for comparison with the image on the film 11.

Second Embodiment

A photographing system of the second embodiment is substantially the same as that of the first embodiment except that an additional code can be input to the identification code to enhance the selecting operation of the desired still image and the management of customers.

Figure 5:
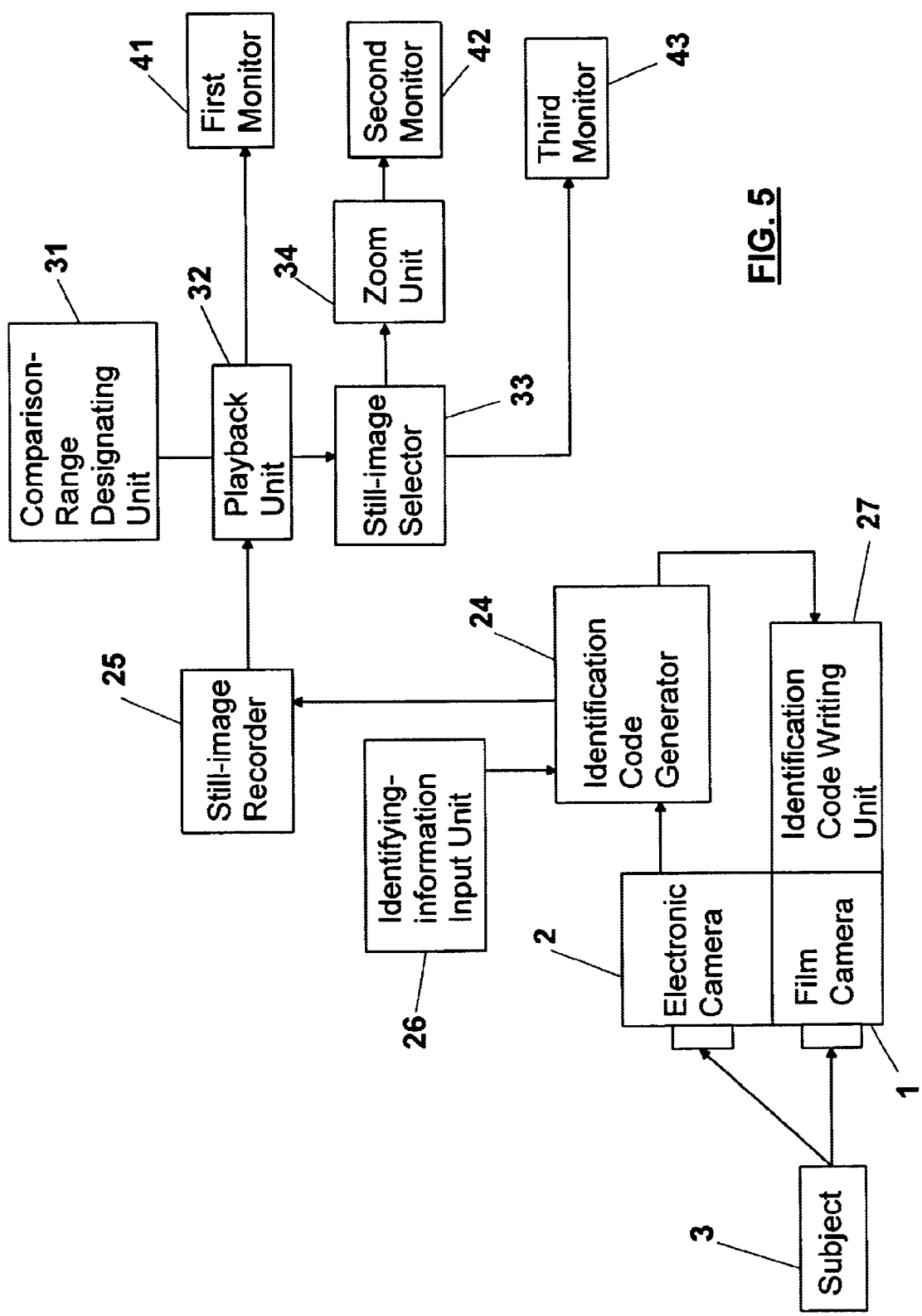
FIG. 5 is a block diagram of a photographing system according to a second embodiment of the present invention.

In addition to the components of the photographing system of the first embodiment, as shown in FIG. 5, the photographing system of the second embodiment further comprises an identifying-information input unit 26 with a keyboard for inputting a group code as additional identifying information to the identification code. That is, the identification code of this embodiment is composed of the order code that is sequentially generated every photographing operation by the identification code generator 24, and the group code input by the identifying-information input unit 26.

The group code is usually input by the operator of the photo studio, and includes a customer code for identifying the customer's name and a classification code for classifying the still images of the subject with different clothes, poses or number of people. For example, when the customer code is "10023", the classification code is "0015", and the order code is "46", the identification code is displayed as "10023-0015-46". The order code of the identification code is changed every photographing. Therefore, when an image of the same customer (i.e., the same customer code) is taken at the next time under the same photographing contents (i.e., the same classification code), the identification code is displayed as "10023-0015-47".

In addition, when a customer code of the group code is designated by the comparison-range designating unit 31, only the still images of the same classification code can be automatically retrieved from the still images of the identification codes with the designated customer code, and displayed in sequence according to the order codes on the first monitor 41.

The playback unit 32 can inquire a group code in the identification codes recorded in the still-image recorder 25, so that the still images corresponding to the identification codes having the group code and the customer code designated by the comparison-range designating unit 31 are retrieved and displayed on the first monitor 41. According to this playback unit 32, for example, it is possible to compare the still images of the customer taken under a photographing condition of the same cloth, same pose, or the same number of people with each other on the first monitor 41. This enhances selecting the desired still image(s) meeting the customer's request.

By the way, when the photographing condition such as the cloth, pose or the number of people is changed, a different group code is generated. Therefore, there is a case that it is needed to select only the still images having a specific group code from the still images having different group codes. In such a case, the still images having the specific group code are retrieved from the still-image recorder 25 within a comparison range designated by the comparison-range designating unit 31 and displayed on the first monitor 41. Then, a desired still image is selected from the still images on the first monitor 41. The selecting operation is finished by use of the keyboard or the keypad for the comparison-range designating unit 31.

The identification codes of the still images recorded in the still-image recorder 25 are inquired to check as to whether the identification code having another classification code and the same customer code is found or not. When such an identification code is found, the still images corresponding thereto are displayed on the first monitor 41 to select a desired still image. The displaying and selecting operations are repeated until checking all of the still images corresponding to the identification code having the same customer code in the still-image recorder 25 is finished. Since the other components and their functions are the same as the first embodiment, duplicate explanation therefor is omitted.

Third Embodiment

A photographing system of the third embodiment is substantially the same as that of the first embodiment except that a trimming operation can be performed in association with a function of designating a region on the second monitor 42.

Figure 6:
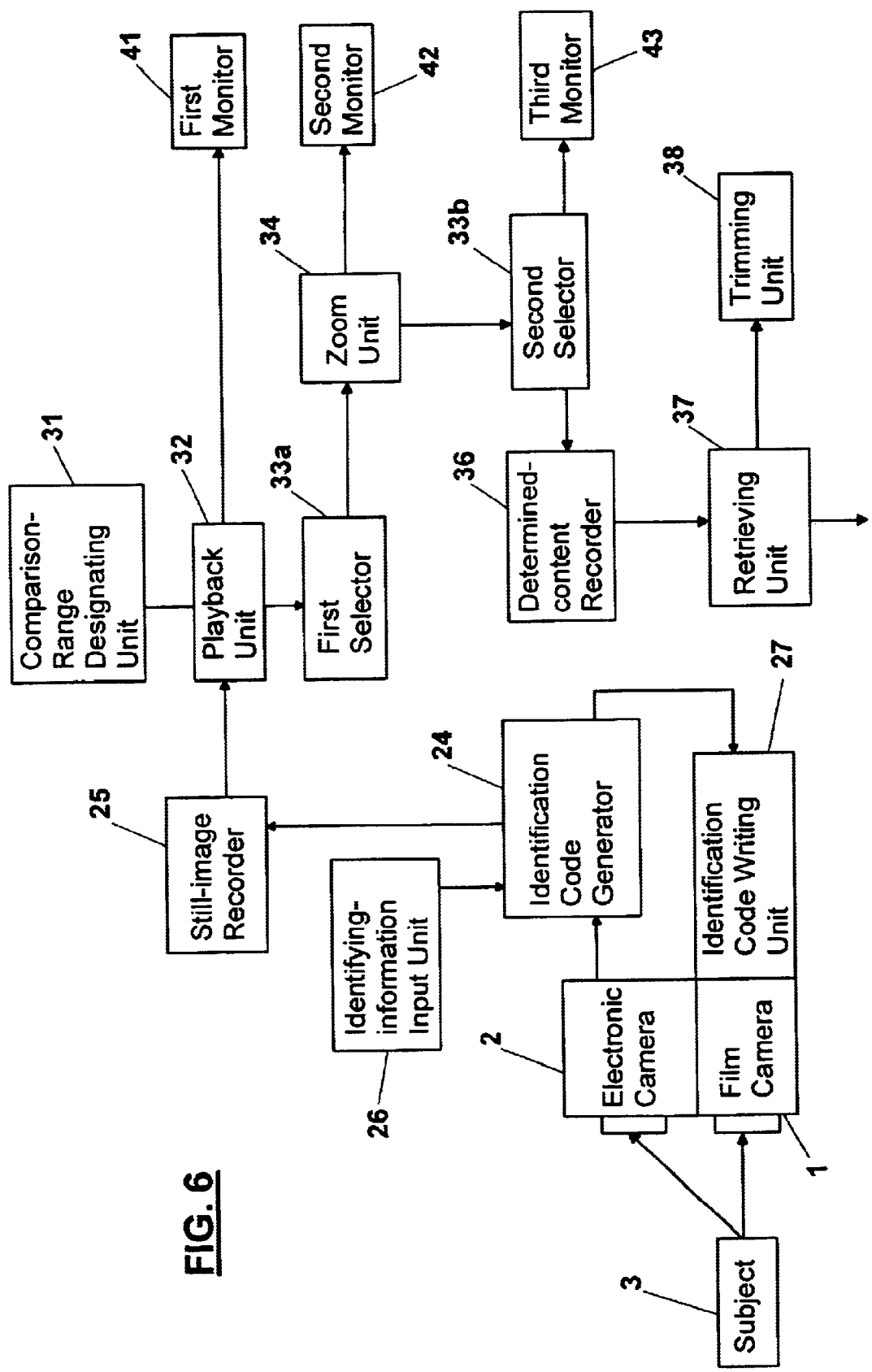
FIG. 6 is a block diagram of a photographing system according to a third embodiment of the present invention.

In the photographing system of the third embodiment, as shown in FIG. 6, a still-image selector is mainly composed of a first selector 33a for selecting the still images to be displayed on the second monitor 42 from the still images displayed on the first monitor 41, and a second selector 33b for displaying a region designated by the zoom unit 34 of the still image selected by the first selector 33a on the third monitor 43. That is, the still image selected by the first selector 33a is enlarged by the zoom unit 34, if necessary, and displayed on the second monitor 42. Whether the still image on the second monitor 42 is adopted or rejected is determined by the second selector 33b. When the still image is adopted, the still image displayed on the second monitor 42 is displayed on the third monitor 43, and also stored in a determined-content recorder 36 together with the identification code thereof and information about the region of the still image designated on the second monitor 42.

Since the information stored in the determined-content recorder 36 corresponds to the still images displayed on the third monitor 43, it is possible to readily identify a required image on the photosensitive material according to comparison of the identification code retrieved by a retrieving unit 37 with the identification code written on the film 11. In addition, the information about the region of the still image designated on the second monitor 42 stored in the determined-content recorder 36 is sent from the retrieving unit 37 to a trimming unit 38. By this trimming unit 38, it is possible to automatically set a trimming range for printing the image on the film 11 on a printing paper according to the region of the still image designated by the zoom unit 34. When performing the trimming operation, it is required that the visual field of the film camera 1 is in agreement with the visual field of the electronic camera 2.

For example, the trimming information about the region of the still image designated on the second monitor 42 by the zoom unit 34 is sent together with the identification code to a printing device (not shown). The printing device has the capability of controlling a printing region according to the trimming information. Therefore, the correspondence between the still image on the second monitor 2 and the image on the film 11 is checked by the identification code, and the trimming operation is controlled according to the trimming information to obtain a photograph of the designated region of the image. Thus, it is possible to automate the trimming operation by use of the trimming unit 38. Since the other components and their operations are substantially the same as the first or second embodiment, duplicate explanation is omitted.

What is claimed is:

1. A photographing system comprising:
   a film camera for recording an image of a subject on a photosensitive material;
   an electronic camera for taking a still image of said subject in synchronization with a release of a shutter of said film camera, which is disposed such that a visual field of said electronic camera has a part of the visual field of said film camera;
   an identification-code generator for generating an identification code every photographing operation with use of said film camera and said electronic camera;
   identification-code writing means for writing the identification code at a position other than the image on the photosensitive material to make a one-to-one correspondence between the image on the photosensitive material and the identification code;
   a still-image recorder for recording the still image taken by said electronic camera together with the identification code;
   playback means for retrieving the still image from said still-image recorder;
   a first monitor having a plural-part split screen, on which a plurality of still images obtained by repeating the photographing operation can be simultaneously displayed with corresponding identification codes;
   a still-image selector for selecting a desired still image from the still images displayed on said first monitor;
   a second monitor having a plural-part split screen, on which the desired still image selected by said still-image selector can be displayed with the corresponding identification code;
   a third monitor having an unsplit screen, on which the desired still image selected by said selector can be enlarged and displayed; and
   input means for inputting an additional code for adding a classification of the still images to the identification code.

2. The photographing system as set forth in claim 1, further comprising an additional recorder for recording the identification code of the desired still image selected by said selector.

3. The photographing system as set forth in claim 1, further comprising zoom means for selectively providing a first mode for displaying the desired still image selected by said selector on said third monitor, and a second mode for designating a region of the desired still image and displaying an enlarged view of the designated region on said third monitor.

4. The photographing system as set forth in claim 3, wherein a visual field of said film camera is in agreement with the visual field of said electronic camera, and wherein the photographing system comprises trimming means having the capability of determining a printing range of the image on the photosensitive material according to a region of the desired still image designated by said zoom means.

5. The photographing system as set forth in claim 1, wherein said additional code is a group code for classifying the still images according to photographing contents, and wherein said playback means retrieves the still images having the same group code from said still-image recorder to simultaneously display the still images on said first monitor.

6. The photographing system as set forth in claim 5, wherein said playback means has the capability of retrieving yet-to-be displayed still images having a same group code from said still-image recorder to simultaneously display the still images on said first monitor.

7. The photographing system as set forth in claim 1, wherein said identification-code writing means uses a light-emitting device to write said identification code onto said photosensitive material.

8. A photographing system comprising:
   a film camera for recording an image of a subject on a photosensitive material;
   an electronic camera for taking a still image of said subject in synchronization with a release of a shutter of said film camera, which is disposed such that a visual field of said electronic camera has a part of the visual field of said film camera;
   an identification-code generator for generating an identification code every photographing operation with use of said film camera and said electronic camera;
   identification-code writing means for writing the identification code at a position other than the image on the photosensitive material to make a one-to-one correspondence between the image on the photosensitive material and the identification code;
   a still-image recorder for recording the still image taken by said electronic camera together with the identification code;
   playback means for retrieving the still image from said still-image recorder;
   a first monitor having a plural-part split screen, on which a plurality of still images obtained by repeating the photographing operation can be simultaneously displayed with corresponding identification codes;
   a still-image selector for selecting a desired still image from the still images displayed on said first monitor;

a second monitor having a plural-part split screen, on which the desired still image selected by said still-image selector can be displayed with the corresponding identification code; and input means for inputting an additional code for adding a classification of the still images to the identification code;

wherein said additional code is a group code for classifying the still images according to photographing contents, and wherein said playback means retrieves the still images having the same group code from said still-image recorder to simultaneously display the still images on said first monitor.

9. The photographing system as set forth in claim 7, wherein said playback means has the capability of retrieving yet-to-be displayed still images having a same group code from said still-image recorder to simultaneously display the still images on said first monitor.

10. A photographing method comprising the steps of:

recording an image of a subject on a photosensitive material by a film camera;

taking a still image of said subject by an electronic, camera in synchronization with a release of a shutter of said film camera;

writing an identification code generated every photographing operation with use of said film camera and said electronic camera at a position other than the image on the photosensitive material to make a one-to-one correspondence between the image on the photosensitive material and the identification code;

recording the still image taken by said electronic camera together with the identification code in a still-image recorder;

retrieving a plurality of still images obtained by repeating the photographing operation from said still-image recorder;

simultaneously displaying the still images-together with corresponding identification codes on a first monitor having a plural-part split screen;

selecting a desired still image from the still images displayed on said first monitor;

displaying the desired still image together with the corresponding identification code on a second monitor having a plural-part split screen;

printing the image on the photosensitive material having the identification code that is the same as the identification code displayed on said second monitor;

enlarging and displaying the desired still image selected by said selector on a third monitor, said third monitor having an unsplit screen; and inputting an additional code for adding a classification of the still images to the identification code.

11. The photographing method as set forth in claim 10, wherein a light-emitting device is used to write said identification code onto said photosensitive material.

12. A photographing system comprising:

a film camera, an electronic camera, an identification-code generator, an identification-code writing unit, and an input unit;

said electronic camera capturing a still image of a subject as an electronic signal for storage on a storage medium while said film camera records a corresponding image of said subject onto a photosensitive material;

said identification-code generator producing a plurality of identification codes,
an identification code of said plurality of identification codes being associated with said still image,
said identification code distinguishing said still image from another still image,
said still image being stored along with said identification code;

said identification-code writing unit writing said identification code onto said photosensitive material; and said input unit inputting an additional code for adding a classification of the still images to the identification code.

13. The photographing system as set forth in claim 12, wherein said identification-code writing unit uses a light-emitting device to write said identification code onto said photosensitive material.

14. The photographing system as set forth in claim 12, further comprising a still-image recorder for recording said still image along with identification code.

15. The photographing system as set forth in claim 13, wherein said identification code that is stored with said still image is equal to said identification code that is recorded on said photosensitive material along with said corresponding image.

* * * * *